(12) United States Patent
Wiemann et al.

(10) Patent No.: US 9,363,065 B2
(45) Date of Patent: Jun. 7, 2016

(54) METHODS AND DEVICES FOR CONTROLLING THE DEACTIVATION OF TRANSMISSION CARRIERS

(71) Applicant: Telefonaktiebolaget L M Ericsson (publ), Stockholm (SE)

(72) Inventors: Henning Wiemann, Aachen (DE); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/739,359

(22) Filed: Jun. 15, 2015

(65) Prior Publication Data

US 2015/0280891 A1    Oct. 1, 2015

Related U.S. Application Data

(63) Continuation of application No. 13/636,602, filed as application No. PCT/EP2011/055146 on Apr. 1, 2011, now Pat. No. 9,065,650.

(60) Provisional application No. 61/320,021, filed on Apr. 1, 2010.

(51) Int. Cl.
*H04J 3/14* (2006.01)
*H04L 12/26* (2006.01)
(Continued)

(52) U.S. Cl.
CPC ............... *H04L 5/0098* (2013.01); *H04L 1/08* (2013.01); *H04L 1/1829* (2013.01); *H04L 1/1867* (2013.01); *H04L 5/0053* (2013.01)

(58) Field of Classification Search
CPC .......... H04J 3/14; H04L 43/50; H04W 80/04; H04W 88/06
USPC .................................................. 370/242, 328
See application file for complete search history.

(56) References Cited

U.S. PATENT DOCUMENTS

2009/0279480 A1    11/2009  Rosenqvist et al.
2011/0026422 A1     2/2011  Ma et al.
(Continued)

FOREIGN PATENT DOCUMENTS

CN        101690369 A      3/2010
KR    1020110094760 A      8/2011
(Continued)

OTHER PUBLICATIONS

3GPP. "Further details of activation/deactivation." 2 pages. 3GPP TSG-RAN WG2 #69. San Francisco, CA, Feb. 22-26, 2010. Tdoc R2-101179. 3GPP, Sophia Antipolis, France.
(Continued)

*Primary Examiner* — Ronald B Abelson
(74) *Attorney, Agent, or Firm* — Coats & Bennett, P.L.L.C.

(57) ABSTRACT

In a communication system, activity of a transmitter, e.g., a UE, is controlled in response to a deactivation command. The transmitter receives data on at least one transmission carrier and, if a received transmission of data is found to be defective, may send a repeat request to trigger a retransmission of the data. In response to receiving the deactivation command, the transmitter performs a check whether a retransmission is expected on the at least one transmission carrier. If a retransmission is expected, execution of the deactivation command to deactivate the transmission carrier is delayed until the retransmission is received or a timer has expired.

16 Claims, 8 Drawing Sheets

(51) Int. Cl.
*H04W 80/04* (2009.01)
*H04W 88/06* (2009.01)
*H04L 5/00* (2006.01)
*H04L 1/18* (2006.01)
*H04L 1/08* (2006.01)

(56) References Cited

U.S. PATENT DOCUMENTS

2011/0199951 A1  8/2011  Kwon et al.
2011/0243048 A1  10/2011  Wang et al.

FOREIGN PATENT DOCUMENTS

| KR | 1020100014359 | * | 2/2015 | ............... H04B 7/26 |
| WO | 2008054310 A2 | | 5/2008 | |
| WO | 2009022748 A1 | | 2/2009 | |
| WO | 2009154540 A1 | | 12/2009 | |
| WO | 2010051209 A1 | | 5/2010 | |

OTHER PUBLICATIONS

3GPP. "Impact of retransmissions on common DRX performance." Tdoc R2-102040. 3GPP TSG-RAN WG2 #69bis, Beijing, China, Apr. 12-16, 2010. 3GPP, Sophia Antipolis, France.

3GPP. "DRX in Carrier Aggregation—Active Time." R2-101527. 3GPP TSG-RAN WG2 Meeting #69, San Francisco, CA, Feb. 22-26, 2010. 3GPP, Sophia Antipolis, France.

3GPP. "Stage 2 description of Carrier Aggregation." Change Request. R2-101846. 3GPP TSG-RAN WG2 Meeting #69, San Francisco, CA, Feb. 22-26, 2010. 3GPP, Sophia Antipolis, France.

3GPP. "3rd Generation Partnership Project;Technical Specification Group Radio Access Network; Evolved Universal Terrestrial Radio Access (E-UTRA) Medium Access Control (MAC) protocol specification (Release 9)." 3GPP TS 36.321 V9.1.0. Dec. 2009. 3GPP, Sophia Antipolis, France.

\* cited by examiner

METHODS AND DEVICES FOR CONTROLLING THE DEACTIVATION OF TRANSMISSION CARRIERS

CROSS REFERENCE TO RELATED APPLICATIONS

The present application is a continuation of application Ser. No. 13/636,602, which is the National Stage of International Application No. PCT/EP2011/055146, filed Apr. 1, 2011, which claims the benefit of Provisional Application No. 61/320,021, filed Apr. 1, 2010. Each of these applications are incorporated herein by reference in their entirety.

TECHNICAL FIELD

The present invention relates to methods for controlling activity of a transmitter and to corresponding devices.

BACKGROUND

In mobile communication networks, e.g., according to the technical specifications (TSs) of the Third Generation Partnership Project (3GPP), there is a general trend to support higher bandwidths for communication of data with a user equipment (UE).

For example, in 3GPP Long Term Evolution (LTE) Release 8, in the following also referred to as LTE Rel-8, bandwidths up to 20 MHz are supported. However, in order to meet upcoming IMT-Advanced requirements (IMT: International Mobile Telecommunications), work on LTE-Advanced was initiated. One of the parts of LTE-Advanced is to support bandwidths larger than 20 MHz. Accordingly, in 3GPP LTE Release 10, in the following also referred to as LTE Rel-10, a concept called "carrier aggregation" is being introduced. According to this concept, multiple component carriers, each of which may be up to 20 MHz wide, may be aggregated together. Carrier aggregation implies that an LTE Rel-10 terminal can receive and send on multiple component carriers. The component carriers may have the same structure as a carrier according to LTE Rel-8.

The aggregated component carriers may be adjacent to each other. However, in more general terms the carrier aggregation may also allow for non-adjacent component carriers, including carriers in different frequency bands, or both adjacent and non-adjacent component carriers. Thus, the introduction of carrier aggregation as part of LTE Rel-10 allows for spectrum aggregation, i.e., the simultaneous usage of different non-contiguous spectrum fragments for communication in a downlink (DL) direction to a single mobile terminal or in an uplink (UL) direction from a single mobile terminal.

Among other things, the carrier aggregation concept allows for supporting higher bit-rates, farming of a non-contiguous spectrum, i.e., to provide high bit-rates and better capacity also in cases when an operator lacks corresponding contiguous spectrum capacities, and/or fast and efficient load balancing between carriers.

It should be noted that carrier aggregation may be implemented as a UE-specific concept. That is to say, one UE may be configured to use some specific component carriers from an available set of component carriers, while a further UE may be configured to use only a single component carrier of the set carrier and a still further UE may be configured to use all of the component carriers of the set. For example, UEs may be configured to use the component carriers of a specific network operator.

Thus, in the above-mentioned carrier aggregation concept, a UE can be configured with one Component Carrier (CC), a carrier of a specific frequency, or multiple CCs, which may be within the same frequency band or different frequency bands. Carrier aggregation may be used in the DL, i.e., for transmissions to the UE, and in the UL, i.e., for transmissions from the UE. Multiple UL and DL CCs are may be configured independently of each other, meaning that they are not necessarily configured as UL/DL pairs, e.g., as in LTE Rel-8.

In LTE Rel-10 there may be up to 5 DL CCs and 5 UL CCs configured for one specific UE.

Typically, the UE initially selects a DL CC and finds, in system information blocks (SIB) of a cell transmitting on that DL CC, information about the corresponding UL CC. The UE then performs a Random Access (RA) on the latter and receives a RA response on the DL CC. Then, a Radio Resource Control (RRC) connection is established. These CCs are referred to as Primary Component Carrier (PCC), in particular as the UL PCC and the DL PCC. The cell to which the UE establishes its RRC connection is referred to as Primary Serving Cell (PCell). The UL PCC may be used for transmission of L1 UL control information. The DL PCC cannot be deactivated. Non-Access Stratum (NAS) information is taken from the DL PCC. When the DL FCC experiences Radio Link Failure (RLF), RRC Connection re-establishment will be triggered, regardless of RLF status on the other DL CCs.

Handover of the FCC to another eNB (evolved NodeB, base station in 3GPP LTE) or another carrier of the same eNB is allowed, but it may require renewal of the Access Stratum (AS) security keys.

In addition to the UL/DL PCC pair, the eNB may configure the UE with additional component carriers, which are referred to as Secondary Component Carrier (SCC). The cell of such a SCC to which the UE connects is also referred to as Secondary Cell (Scell). For a specific UE, the DL SCCs are per default deactivated, but may be activated and deactivated as described in the next section.

To ensure reasonable UE battery consumption when CA is configured, a CC activation/deactivation mechanism for DL SCCs may be provided. Typically, this activation/deactivation mechanism does not apply to the PCC. When a DL SCC is not activated for a specific UE, the UE does not need to receive the corresponding Physical Downlink Control Channel (PDCCH) or Physical Downlink Shared Channel (PDSCH), nor is it required to perform Channel Quality Indicator (CQI) measurements for channel quality estimation. Conversely, when a DL SCC is activated for a specific UE, the UE shall receive the corresponding PDSCH and PDCCH (if present), and is expected to be able to perform CQI measurements. In the UL, a UE may transmit on the Physical Uplink Shared Channel (PUSCH) on any configured UL SCC when the UL SCC is active. The UL SCC may be activated/deactivated together with the corresponding DL SOC.

Other details of the activation/deactivation mechanism for SCCs are:
  Explicit activation of DL SCCs is done by Medium Access Control (MAC) signaling from the eNB.
  Explicit deactivation of DL SCCs is done by MAC signaling from the eNB.
  Implicit deactivation of DL SCCs is also possible. For example, the UE may trigger the deactivation if a surveillance timer expires if no data was received for a time period in order to account for missed deactivation signaling.

DL SCCs can be activated and deactivated individually, and a single activation/deactivation command can activate/deactivate a subset of the configured DL SCCs.

SCCs added to the set of CCs configured for a UE are initially "deactivated".

Further, in LTE Rel-8 a feature called DRX (Discontinuous Reception) was introduced. This feature allows the UE to stop monitoring DL data and control channels whenever it is not in "Active Time". The Active Time comprises, e.g., an onDuration, i.e., a short period of activity (e.g., 2 ms) that occurs once per DRX cycle (e.g., 40 ms) and the time when a timer, referred to as the "drx-InactivityTimer", is running. The latter is restarted for each DL transmission attempt, i.e., successful or unsuccessful data reception at the UE, and ensures that the UE stays active while continuously receiving data.

Furthermore, when the UE is not able to decode a DL transmission attempt it sends a HARQ NACK, i.e., a negative acknowledgement message of a Hybrid Automatic Repeat Request (HARQ) protocol, and it needs to ensure that it is not in DRX status when the retransmission is to be expected. This is achieved by further timers, referred to as the "HARQ RTT Timer" and "drx-RetransmissionTimer". The HARQ RTT Timer is started when a DL transmission is indicated to a UE. When the HARQ RTT Timer expires, after a HARQ Round Trip Time (RTT), the drx-RetransmissionTimer is started if the previous reception attempt was not successful, i.e., if a HARQ retransmission is to be expected. The drx-RetransmissionTimer shall ensure a sufficient period of activity after an HARQ RTT Timer expires, i.e., after the earliest arrival time of a retransmission, and may be set in present LTE systems to values between 1 ms, e.g. in case of synchronous retransmission, and several ms, e.g., to account for asynchronous retransmission.

It is assumed that the eNB typically deactivates the DL SCC(s) when the DL data queue in the eNB runs empty, i.e., when there is presently no data for transmission. To do so, it may send a deactivation command with a corresponding MAC Control Element (CE) in the last transport block on one or more of the activated CCs. However, some of the transport blocks might need a HARQ retransmission. If the MAC protocol data unit (PDU) with the MAC CE for deactivation arrives on the first attempt and if the UE strictly follows the deactivation command, the UE will not be able to receive the potential retransmission on deactivated CC.

Accordingly, there is a need for techniques which allow for efficiently controlling deactivation of transmission carriers in a communication system using retransmissions, e.g., retransmissions triggered by repeat requests such as in the above-mentioned HARQ protocol according to 3GPP LTE.

SUMMARY

According to an embodiment of the invention, a method of controlling activity of a transmitter in a communication system with repeat requests is provided. The method may be implemented in a transmitter, e.g., a UE. The transmitter is adapted to receive data on at least one transmission carrier. According to the method, the transmitter receives a deactivation command for deactivation of the at least one transmission carrier. In response to the deactivation command, the transmitter performs a check whether a retransmission is expected on the at least one transmission carrier. If a retransmission is expected, execution of the deactivation command is delayed until the retransmission is received or a timer has expired.

According to a further embodiment of the invention, a transmitter is provided. The transmitter may be a UE. The transmitter comprises a receiver unit, a transmitter unit, and a processor. The receiver unit is adapted to receive data transmissions, retransmissions, and deactivation commands. The transmitter unit is adapted to send repeat requests. The processor is adapted to control deactivation of transmission carriers by executing a received deactivation command for deactivating at least one transmission carrier used by the receiver unit to receive the data transmissions. The processor is further adapted to perform a check whether a retransmission is expected on the at least one transmission carrier and, if a retransmission is expected, delay execution of the deactivation command until the retransmission is received or a timer has expired.

According to a further embodiment of the invention, a communication system is provided. The communication system comprises a transmitter, e.g., a UE, and a base station, e.g., an eNB. The base station is adapted to send transmissions of data, retransmissions and deactivation commands to the transmitter. The transmitter is adapted to receive the transmissions of data, the retransmissions, and the deactivation commands from the base station. The transmitter is also adapted to send repeat requests to trigger the retransmissions to the base station. The transmitter is further adapted to control deactivation of transmission carriers by executing a received deactivation command for deactivation of at least one transmission carrier used to receive the transmissions of data. Further, the transmitter is adapted to perform a check whether a retransmission is expected on the at least one transmission carrier and, if a retransmission is expected, delay execution of the deactivation command until the retransmission is received or a timer has expired.

According to further embodiments, other methods, devices, or computer program products including program code to be executed by a processor for implementing the methods may be provided.

BRIEF DESCRIPTION OF THE DRAWINGS

FIG. 5 illustrates an exemplary scenario of deactivating transmission carriers according to an embodiment of the invention.

FIG. 6 illustrates further exemplary scenario of deactivating transmission carriers according to an embodiment of the invention.

DETAILED DESCRIPTION OF EMBODIMENTS

In the following, the invention will be explained in more detail by referring to exemplary embodiments and to the accompanying drawings. The illustrated embodiments relate to concepts for controlling activity of a transmitter in a communication system using retransmissions triggered by repeat requests. In the illustrated examples, it will be assumed that the communication system is implemented according to 3GPP LTE and supports carrier aggregation, and that the concepts are applied to controlling deactivation of one or more component carriers, in particular SCCs, used by the UE for receiving data from the eNB. However, it is to be understood that the illustrated concepts may also be applied in other types of mobile communication networks.

Figure 1:
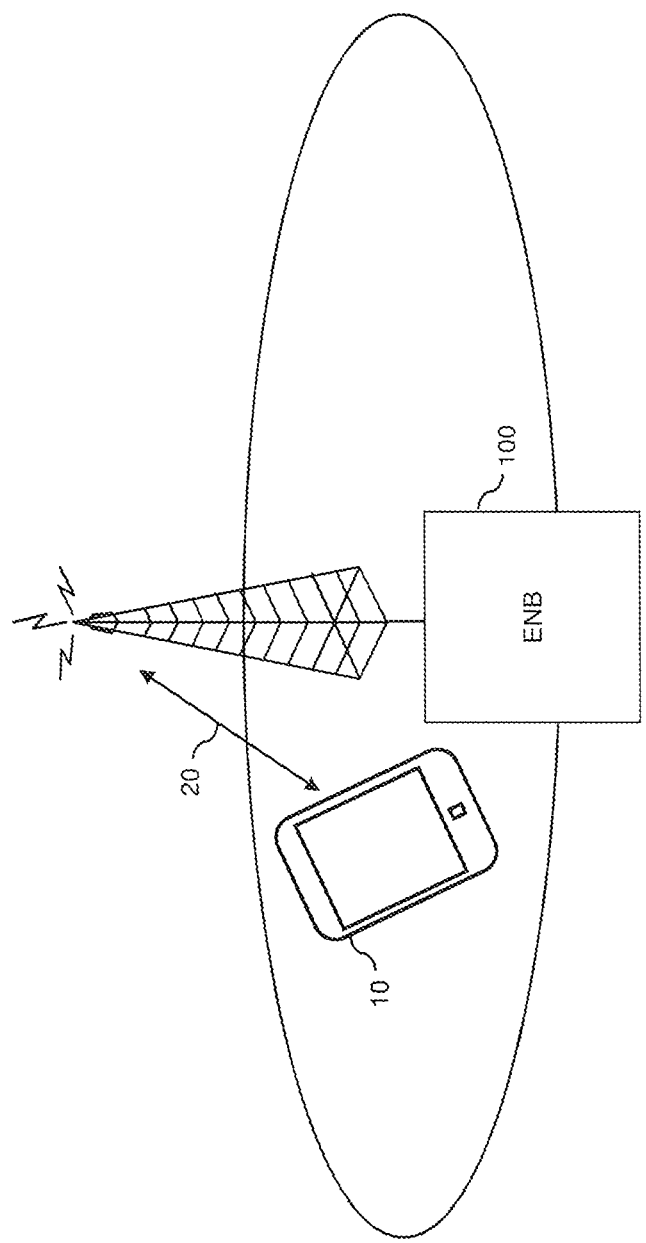
FIG. 1 schematically illustrates a communication system in which concepts of activity control according to an embodiment of the invention can be applied.

FIG. 1 schematically illustrates a communication system including a base station 100 and a UE 10 communicating with the base station 100. The UE 10 may be, e.g., a mobile phone, portable computer, or other type of UE. As illustrated, the UE 10 communicates with the base station 100 via a radio link 20. In accordance with the illustrated 3GPP LTE scenario, the base station 100 may be an eNB and the radio link 20 may be established using the Uu radio interface. The radio link 20 may carry data traffic in the DL direction from the base station 100 to the UE 10 and/or in the UL direction from the UE 10 to the base station 100.

Figure 2:
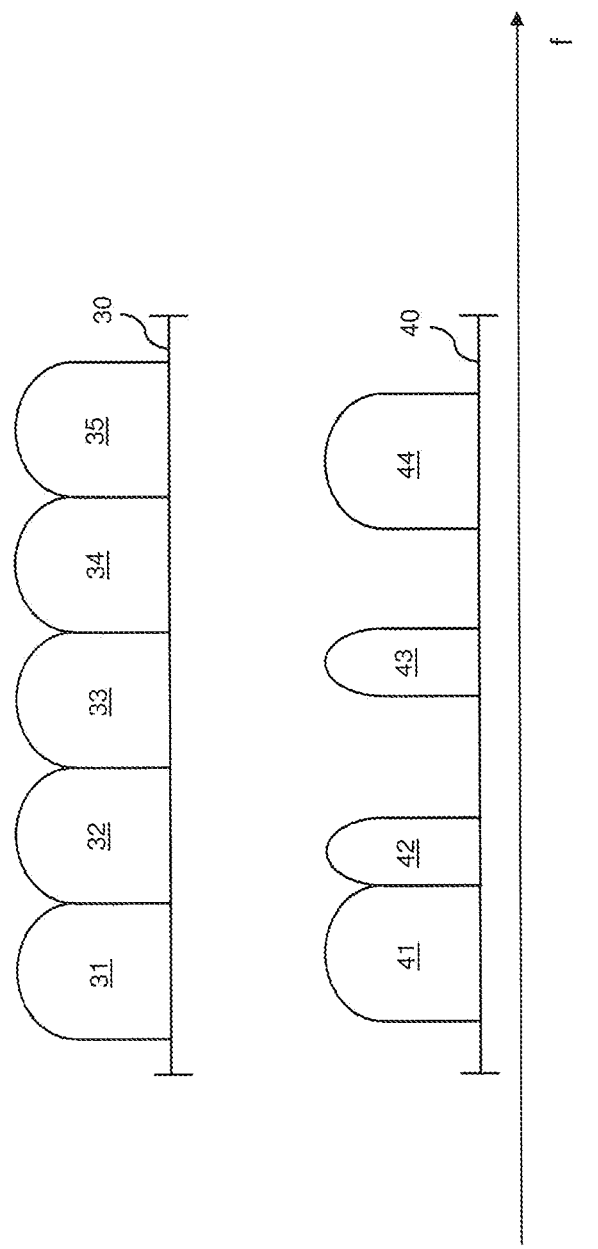
FIG. 2 schematically illustrates exemplary carrier aggregation constellations which may be used in an embodiment of the invention.

In accordance with the concepts as described herein, carrier aggregation may be used on the radio link 20 between the UE 10 and the base station 100, e.g., using the concepts as explained above in the background section. That is to say, a constellation of multiple CCs may be used for transmitting radio signals on the radio link 20 between the UE 10 and the radio base station 100. In FIG. 2, in which f denotes the frequency, different exemplary constellations 30, 40 are illustrated. The constellation 30 is illustrated as including adjacent CCs 31, 32, 33, 34, and 35. For example, the CCs 31, 32, 33, 34, and 35 may correspond to LTE Rel-8 carriers, and each CC may have a bandwidth of 20 MHz. Since in the illustrated example the number of the CCs in the constellation 30 is five, carrier aggregation can be used to extend the overall transmission bandwidth to an aggregated bandwidth of 100 MHz. The constellation 40 is illustrated as including multiple contiguous and non-contiguous CCs 41, 42, 43, and 44, which may be aggregated from discontinuous portions of the frequency spectrum. As illustrated, a part of the CCs may be contiguous, such as the CCs 41 and 42, whereas other CCs may be non-contiguous and appear somewhere else in the frequency spectrum, such as the CCs 43 and 44. For example, the component carriers 42 may correspond to LTE Rel-8 carriers, and may each have different bandwidths of up to 20 MHz. For example, the CCs 41 and 44 may each have a bandwidth of 20 MHz, and the CCs 42 and 43 may each have a bandwidth of 5 MHz, resulting in an aggregated bandwidth of 50 MHz. Other bandwidths could be used as well, e.g., bandwidths selected from the group consisting of 1.4 MHz, 3 MHz, 5 MHz, 10 MHz, 15 MHz, and 20 MHz, as supported by 3GPP LTE. In the UE 10, the aggregated CCs, i.e., configured CCs, may be activated and deactivated as needed. This may be accomplished in a UE-specific manner. That is to say, some CCs may be activated for the UE 10, while they are deactivated for another UE and vice versa.

Figure 3:
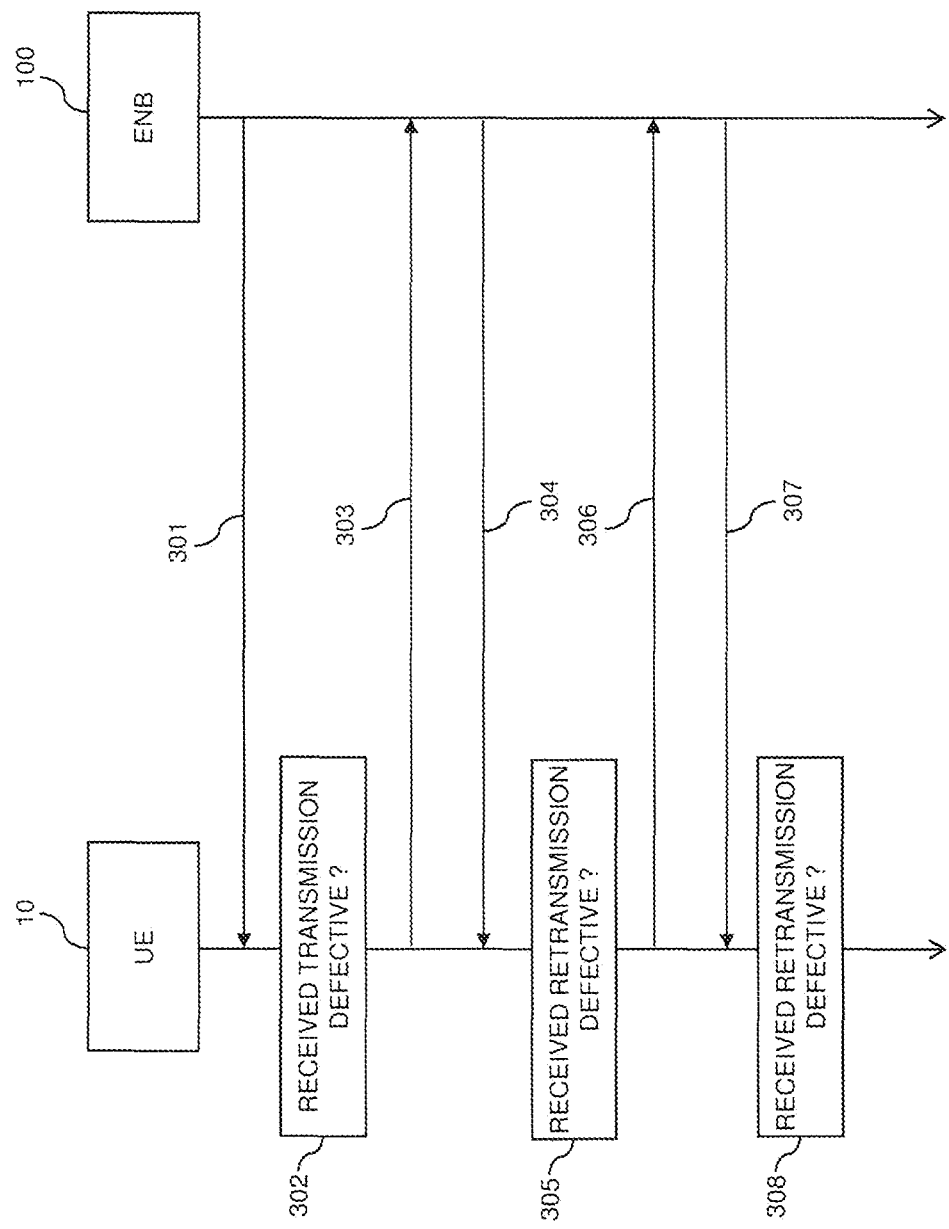
FIG. 3 schematically illustrates retransmission procedures in a communication system according to an embodiment of the invention.

FIG. 3 illustrates retransmission procedures in the communication system. More specifically, FIG. 3 illustrates transmissions and retransmissions between the UE 10 and the base station 100. In the illustrated LTE scenario, the retransmission procedures may be implemented on the basis of a retransmission protocol on the MAC layer, in particular on the basis of the HARQ protocol as used in 3GPP LTE. In this case, the transmissions and retransmissions may each correspond to a respective HARQ process. Here, it is to be understood that the retransmission processes are typically implemented on a transmission carrier level. That is to say, for each transmission carrier received transmissions of data are monitored, and if a received transmission of data is found to be defective, a retransmission on the same transmission carrier is triggered by a repeat request. If the defective transmission was on a DL SCC, the repeat request may be sent on the corresponding UL SCC. Also, it is to be understood that, in a typical communication system according to 3GPP LTE, there may be multiple HARQ processes in parallel on the same CC. For example, one HARQ process may be waiting for its retransmission while another parallel HARQ process receives the first transmission. For the sake of clarity, FIG. 3 illustrates procedures corresponding to a single HARQ process.

As illustrated in FIG. 3, the eNB 100 sends a transmission 301 of data to the UE 10. The transmission 301 of data may be on a DL SCC, e.g., on one from a plurality of aggregated CCs as illustrated in FIG. 2. The transmission 301 of data is received by the UE 10.

As illustrated by block 302, the UE 10 then performs a check to determine if the received transmission 301 of data is defective. This may be accomplished during decoding of the received transmission 301. For example, if decoding is not successful, the received transmission 301 can be determined to be defective.

If the received transmission 301 of data is determined to be defective, the UE 10 sends a repeat request 303, e.g., in the form of a HARQ NACK, to the eNB 100 to trigger a retransmission of the data. If the defective transmission 301 was on a particular DL SCC, the repeat request 303 may be sent on the corresponding UL SCC, e.g., on a Physical Uplink Control Channel (PUCCH) or in Uplink Control Information (UCI). The PUCCH or UCI may be mapped to a PUSCH on the UL SCC. The received transmission 301 of data, which was found to be defective, may be stored in a buffer, e.g., a HARQ process buffer, by the UE 10 so as to be used as additional information when decoding the retransmission. If the received transmission 301 of data is determined to be not defective, the data may be passed to further processing, e.g., to a higher protocol layer. Further, the UE 10 may acknowledge the correct receipt of the transmission 301 to the eNB, e.g., by sending a HARQ ACK, i.e., an acknowledgement message of the HARQ protocol.

The eNB receives the repeat request 303 and, in response to the repeat request, sends a retransmission 304 of the data to the UE 10. If the defective transmission 301 was on a particular DL SCC, the retransmission 304 is sent on the same DL SCC. The retransmission 304 is received by the UE 10.

As illustrated by block 305, the UE 10 then performs a check to determine if the received retransmission 304 is defective. This may be accomplished during decoding of the received retransmission 304. For example, if decoding is not successful, the received retransmission 304 can determined to be defective. When decoding the retransmission 304, the stored transmission 301 can be used as additional information, thereby increasing the chances of successful decoding.

If the also received retransmission 304 is determined to be defective, the UE 10 sends a further repeat request 306, e.g., in the form of a HARQ NACK, to the eNB 100 to trigger a further retransmission of the data. Again, if the defective transmission 301 and retransmission 304 were on a particular DL SCC, the further repeat request 306 may be sent on the corresponding UL SCC, e.g., on the PUCCH or in the UCI, which may be mapped to the PUSCH on the UL SOC. In the same way as the defective received transmission 301, also the defective received retransmission 304 may be stored in the buffer, e.g., a HARQ process buffer, by the UE 10 so as to be used as additional information when decoding the further retransmission. If the received retransmission 304 of data is determined to be not defective, the data may be passed to further processing, e.g., to a higher protocol layer. Further, the UE 10 may acknowledge the correct receipt of the retransmission 304 to the eNB, e.g., by sending a HARQ ACK, i.e., an acknowledgement message of the HARQ protocol.

The eNB 100 receives the further repeat request 306 and, in response to the further repeat request 306, sends a further retransmission 307 of the data to the UE 10. If the defective transmission 301, and the defective retransmission 304 were on a particular DL SCC, the further retransmission 307 is sent on the same DL SCC. The further retransmission 307 is received by the UE 10.

As illustrated by block 308, the UE 10 then may then proceed in the same way as with the retransmission 304 and perform a check to determine if the received further retransmission 308 is defective. This the process of retransmission, check, and repeat request may be iterated until successful decoding of a retransmission is possible. The process may also be aborted when reaching a predefined maximum number of retransmissions or after expiry of a timer. Recovery of the unsuccessful data transmission attempt may then be accomplished at higher protocol layers.

Figure 4:
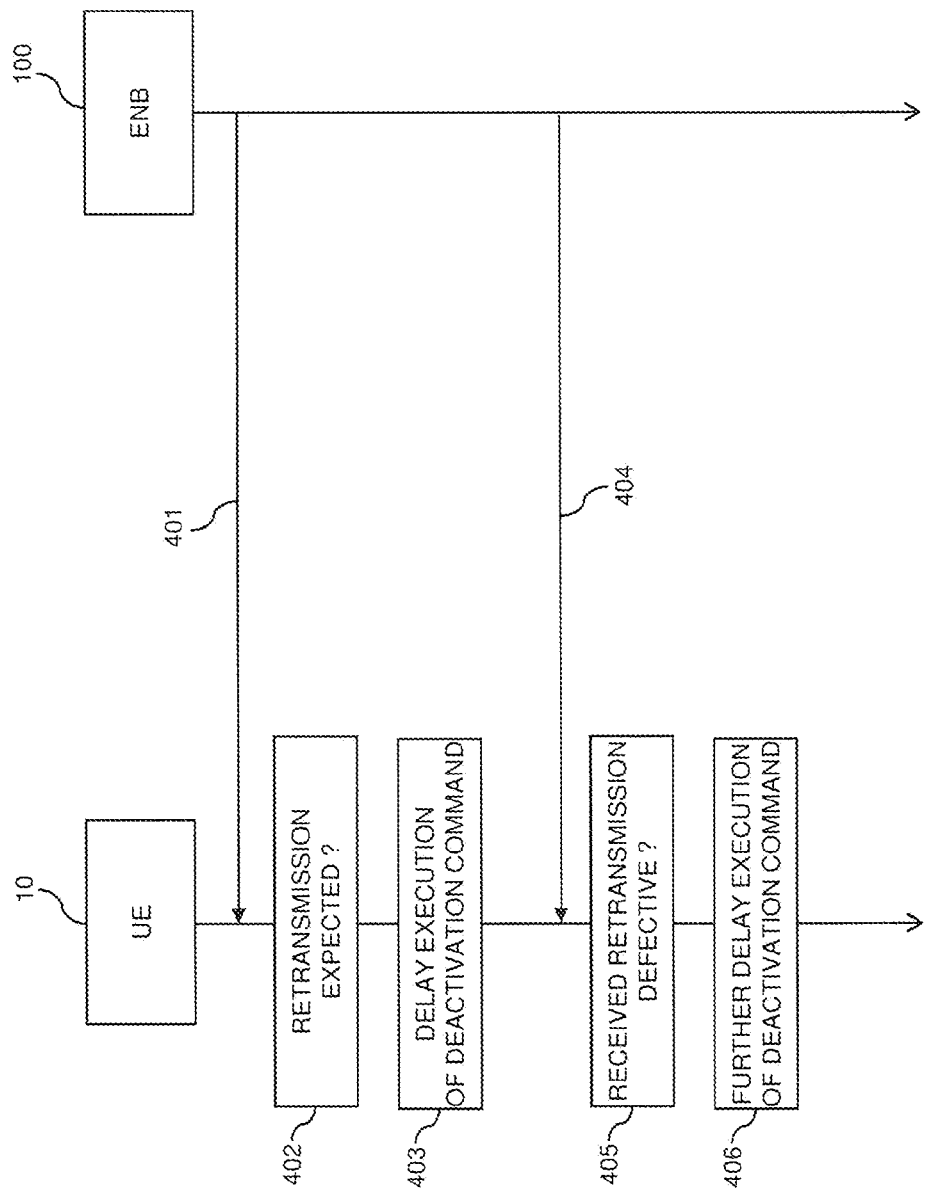
FIG. 4 schematically illustrates processing of a deactivation command according to an embodiment of the invention.

FIG. 4 shows handling of a deactivation command for causing deactivation of a transmission carrier. In the following, it is assumed that the deactivation command has the purpose of deactivating the transmission carrier used for receiving the transmission 301 and possible associated retransmissions 304 and 307 of FIG. 3. However, it is to be understood that there may actually be further transmissions and retransmissions on this transmission carrier, e.g., corresponding to multiple parallel HARQ processes, and that the deactivation command may further have the purpose of deactivating other transmission carriers. For example, the deactivation command may have the purpose of deactivating a plurality of transmission carriers, e.g., a group of DL SCCs. Further, the deactivation command may deactivate one or more UL SCCs together with the corresponding DL SCC.

As illustrated in FIG. 4, the eNB 100 sends the deactivation command 401 to the UE 10. The deactivation command 401 may be sent on a DL PCC or on a DL SCC, e.g., the same as used for the transmission 301 and the associated possible retransmissions 304 and 307 or another DL SCC. The deactivation command 401 may be transmitted in a MAC CE, e.g., in the form of one or more flags or bits, e.g., in the form of a bitmap, to indicate the transmission carrier or transmission carriers to be deactivated. For example, each flag or bit in the MAC CE may indicate deactivation of a SCell, i.e., a DL SCC and corresponding UL SCC.

The deactivation command 401 is received by the UE 10. As indicated by block 402, the UE 10 then performs a check to determine if a retransmission is expected on the transmission carrier to be deactivated. This may be accomplished on the basis of outstanding repeat requests. For example, when receiving the deactivation command 401 during the procedure of FIG. 3, after sending the repeat request 303, but before correctly receiving the retransmission 304, the UE 10 may determine that the retransmission 304 is expected. Similarly, when receiving the deactivation command 401 after sending the further repeat request 306, but before correctly receiving the further retransmission 307, the UE 10 may determine that the retransmission 307 is expected.

As indicated by block 403, if a retransmission is determined to be expected, the UE 10 delays execution of the deactivation command 401. This delay may be until the expected retransmission is received or until a timer has expired. In particular, the UE 10 may delay the deactivation command 401 until all started HARQ retransmission timers for the DL SCC to be deactivated, for all DL SCCs, or for all DL CCs have expired. On the other hand, if the UE 10 determines that no retransmission is expected, the UE 10 may execute the deactivation command 401 without further delay.

As further illustrated in FIG. 4, the eNB 100 sends the expected retransmission 404, which is received by the UE 10. As mentioned above, the retransmission 404 may correspond to the retransmission 304 or to the further retransmission 307 of FIG. 3.

As illustrated by block 405, the UE 10 may then further perform a check if the received retransmission 404 is defective. This may correspond to the check of block 305 or to the check of block 308 as explained in connection with FIG. 3.

As indicated by block 406, if the received retransmission 404 is determined to be defective, the UE 10 may further delay execution of the deactivation command 401. This delay may be until a further retransmission is received or until a timer has expired. In particular, the UE 10 may delay the deactivation command 401 until all started HARQ retransmission timers on that component carrier or on all DL SCCs or on all DL CCs have expired. On the other hand, if the UE 10 determines that the received retransmission 404 is not defective, the UE 10 may execute the deactivation command 401 without further delay.

Using the above procedure, deactivation of the transmission carrier does not adversely affect ongoing retransmission processes, and loss of data is avoided. At the same time, the deactivation can occur as soon as ongoing retransmission processes have been concluded. The use of the timer avoids deadlock situations, e.g., if for some reason an expected retransmission is never received.

In the following, exemplary scenarios of deactivation procedures will be explained in connection with FIGS. 5 to 7. In the exemplary scenarios of FIGS. 5 to 7, synchronous retransmissions are assumed. However, similar concepts may also be applied to non-synchronous retransmissions.

Figures 5, 6:
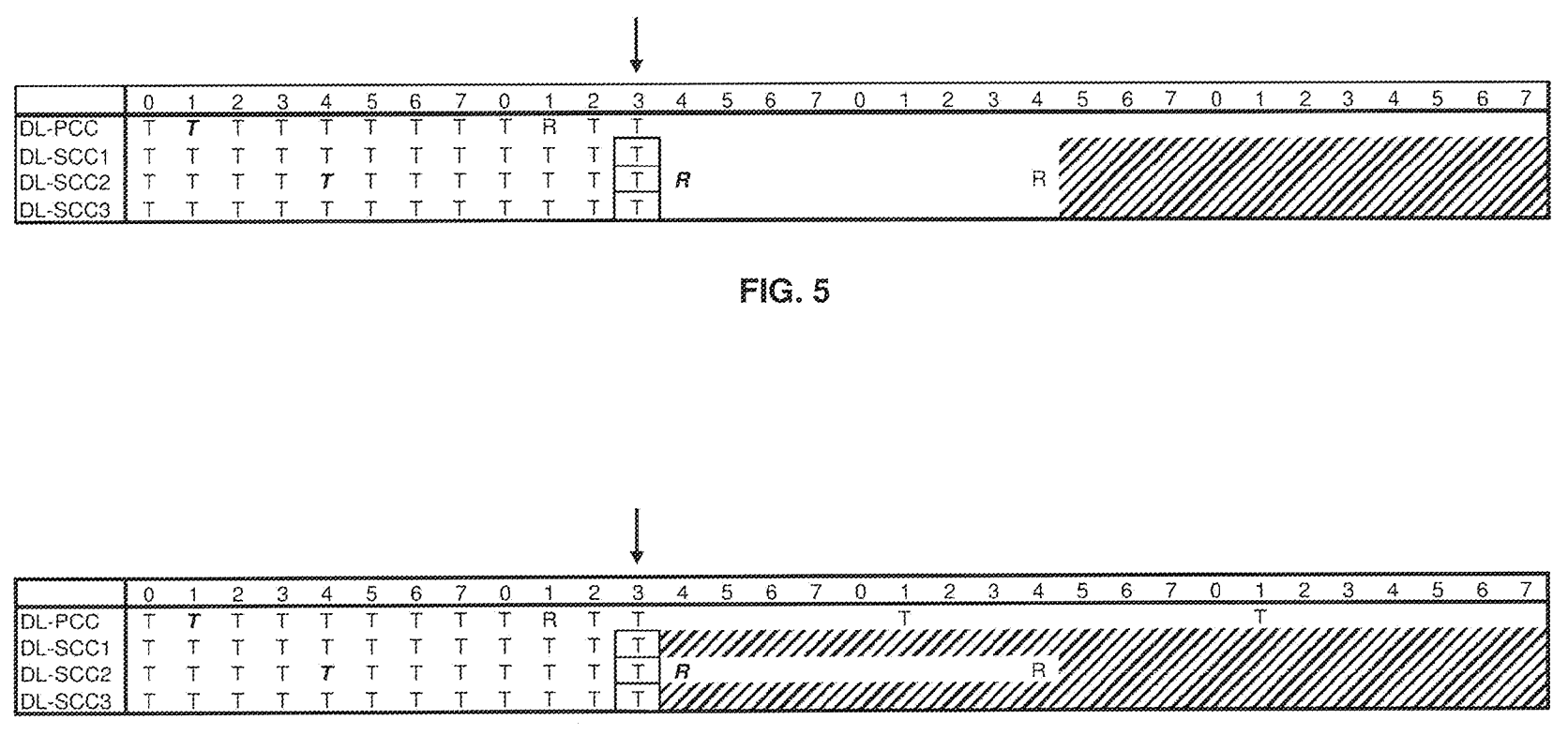

FIG. 5 depicts, in a table format, a scenario in which the eNB transmits data on a DL PCC, denoted as DL-PCC, and three additional DL SCCs, denoted as DL-SCC1, DL-SCC2, and DL-SCC3. The first line in the table shows a sequence of subframes or HARQ processes which may correspond, e.g., to 1 ms each. The lower four lines of the table show the data blocks transmitted on the component carriers in each subframe, a transmission being denoted by a "T". Transmissions denoted by a "T" in bold and italic type are assumed to be defective and require a retransmission which, since synchronous retransmissions are assumed, is performed at the next occurrence of the process, i.e., eight blocks later, on the same CC. Retransmissions are denoted by a "R". Retransmissions denoted by a "R" in bold and italic type are assumed to be defective and require a further retransmission which is performed at the next occurrence of the process, i.e., eight blocks later, on the same CC.

In the second occurrence of HARQ Process 3 of this example, the eNB sends a MAC CE to deactivate the SCCs (subframes marked with black boxes, position indicated by vertical arrow), e.g., due to a lack of new data. For this purpose a flag may set in the corresponding transport blocks sent in this subframe. The deactivation may be specific to particular SCCs. However, in the illustrated scenario, the deactivation is caused for all SCCs. As further illustrated, the HARQ process 4 on DL-SCC2 requires two more retransmissions because also the first retransmission is not correctly received. Consequently, in accordance with the concepts as explained above, the UE delays the deactivation of at least DL-SCC2 until the retransmission is received successfully. In FIG. 5, the deactivation of the DL SCCs is illustrated by the shaded area. As illustrated, all SCCs are deactivated simultaneously.

In some embodiments, only the deactivation of those SCCs is delayed for which retransmissions are still outstanding. This is shown in FIG. 6, which illustrates the same scenario as FIG. 5, but with a delayed deactivation for DL-SCC2 only.

As already explained in connection with FIG. 4, the delayed deactivation of one or more SCCs can be achieved by keeping an SCC activated if a DL data transmission could not be decoded correctly. In this case, the UE sends a HARQ NACK in order to request a retransmission. In LTE this retransmission may come after one HARQ RTT (when assuming synchronous HARQ), but it may also come after several subframes (when assuming asynchronous HARQ).

In some embodiments the UE may also delay the deactivation command until the data in all soft buffers of the DL SCC to be deactivated was successfully decoded. In other words, the UE may not deactivate the DL SCC if one or more processes are still pending for a HARQ retransmission. To prevent dead-lock situations, the UE may also deactivate the DL SCC as soon as the HARQ RTT Timers and the drx-RetransmissionTimer associated with all HARQ Processes of the DL SCC to be deactivated have expired.

In some embodiments, e.g., when assuming a deactivation scenario as illustrated in FIG. 5, it may be required that the above-mentioned conditions be fulfilled by the HARQ processes on all activated SCCs of the UE prior to deactivation of an SCC. This ensures that no DL SCC is deactivated unless all HARQ processes on all DL SCCs have been successfully decoded or until at least the associated HARQ RTT Timers and drx-RetransmissionTimer have expired. This may be advantageous if the physical layer data encoding, e.g., a PUCCH or UCI on PUSCH format, depends on the CCs.

In some scenarios, the physical data layer encoding performed by the UE may depend on the activated SCCs. For example, depending on PUCCH format and PUCCH resource reservation, this may apply for the PUCCH or UCI on PUSCH format. It may then be desirable to ensure that the UE does not change these formats autonomously so that the eNB is aware of the format to be received. This can be achieved by having the UE apply a configured PUCCH or UCI on PUSCH format until all original transmissions and retransmissions on all CCs have been completed and acknowledged on PUCCH or UCI on PUSCH.

In some cases, this means that it may be necessary to deactivate all DL SCCs simultaneously rather than just a sub-set to avoid associated format changes. Accordingly, in some embodiments the UE may also delay the change of the PUCCH or UCI on PUSCH format until it has acknowledged the successful reception of all HARQ processes on all DL SCCs.

Figure 7:
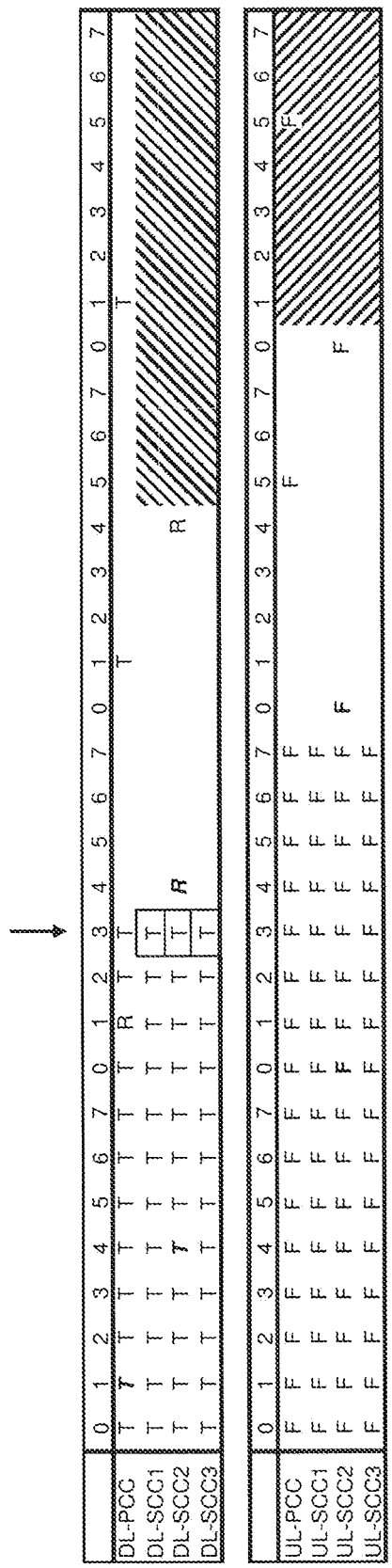
FIG. 7 illustrates a still further exemplary scenario of deactivating transmission carriers according to an embodiment of the invention.

FIG. 7 shows a scenario for illustrating effects of the deactivation of DL SCCs on the UL. In FIG. 7, the DL transmission, illustrated in the upper table, is similar to FIG. 5. Additionally, in the lower table, FIG. 7 illustrates UL transmissions on UL CCs, which include an UL PCC, denoted as UL-PCC, and three UL SCCs, denoted as UL-SCC1, UL-SCC2, and UL-SCC3. The UL transmissions include the HARQ feedback, denoted by "F" corresponding to the DL transmissions. More specifically, the UL-PCC includes the HARQ feedback for the DL-PCC, the UL-SCC1 includes the HARQ feedback for the DL-SCC1, the UL-SCC2 includes the HARQ feedback for the DL-SCC2, and the UL-SCC3 includes the HARQ feedback for the DL-SCC3. In the UL illustrated in the lower table of FIG. 7, an "F" in bold and italic type indicates a negative acknowledgement which triggers a retransmission of a data block 4 subframes later in the DL. In 3GPP LIE, the HARQ feedback is sent 4 ms after the corresponding data block has been received. The shaded area in the lower table indicates that the UE uses another PUCCH or UCI on PUSCH format than before. As can be seen, the change appears once all pending retransmissions on any DL SCC have been completed and acknowledged. Further transmissions on the PDSCH of the DL PCC are acknowledged according to the new format, e.g., as shown in the last HARQ process 5 in the lower table of FIG. 7.

In this way, ambiguities in the transmission of HARQ feedback, e.g., HARQ ACK/NACK, that might otherwise occur due to too early implicit re-selection or change of the PUCCH or UCI on PUSCH format, may be avoided.

Figure 8:
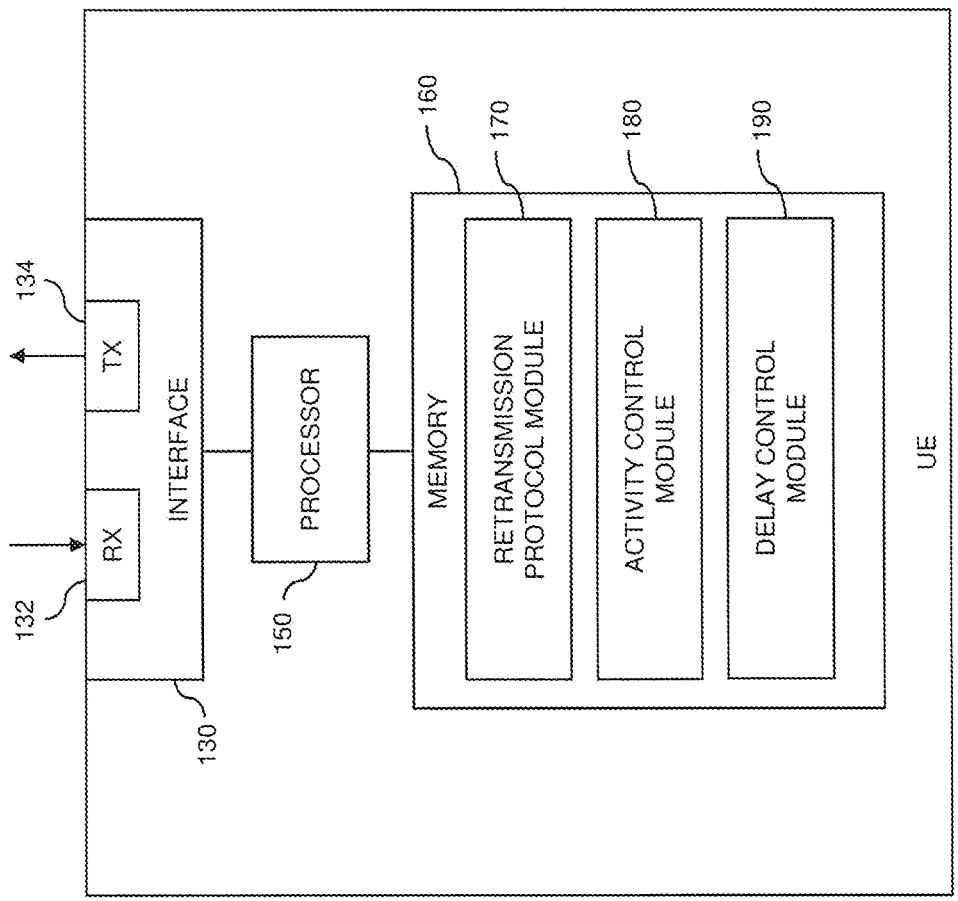
FIG. 8 schematically illustrates a transmitter according to an embodiment of the invention.

FIG. 8 schematically illustrates an exemplary structure for implementing the above-described concepts in a transmitter, e.g., in the UE of FIGS. 1, 3, and 4.

In the illustrated structure, the transmitter includes an interface 130 for data transmission via a plurality of transmission carriers, e.g., using the above described concepts of carrier aggregation. More specifically, the interface 130 is adapted to be used for receiving the above-described data transmissions 301, retransmissions 304, 307, and 404, and deactivation commands 401. For this purpose, the interface 130 is provided with a receiver unit 132. Further, the interface 130 is adapted to be used for sending the above-described repeat requests 303, 306. For this purpose, the interface is provided with a transmitter unit 134. The interface 130 is configured for data transmission via a radio link. For example, the interface 130 may correspond to the Uu radio interface according to the 3GPP TSs.

Further, the transmitter includes a processor 150 coupled to the interface 130 and a memory 160 coupled to the processor 150. The memory 160 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 160 includes suitably configured program code to be executed by the processor 150 so as to implement the above-described functionalities of the transmitter. More specifically, the memory 160 may include a retransmission protocol module 170 for implementing functionalities of data transmission using retransmissions triggered by repeat requests as explained in connection with FIG. 3. Further, the memory 160 may include an activity control module for controlling activation and deactivation of the transmission carriers configured in the interface 130. The activity control may in part be implemented in response to receiving commands, e.g., the above-described deactivation command for deactivating one or more of the transmission carriers configured in the interface 130. Further, the memory 160 may include a delay control module for delaying execution of a received deactivation command as explained in connection with FIG. 4.

It is to be understood that the structure as illustrated in FIG. 8 is merely schematic and that the transmitter may actually include further components which, for the sake of clarity, have not been illustrated, e.g., further interfaces. Also, it is to be understood that the memory 160 may include further types of program code modules, which have not been illustrated. For example, the memory 160 may include program code modules for implementing typical functionalities of a UE. According to some embodiments, also a computer program product may be provided for implementing concepts according to embodiments of the invention, e.g., a computer-readable medium storing the program code and/or other data to be stored in the memory 160.

Figure 9:
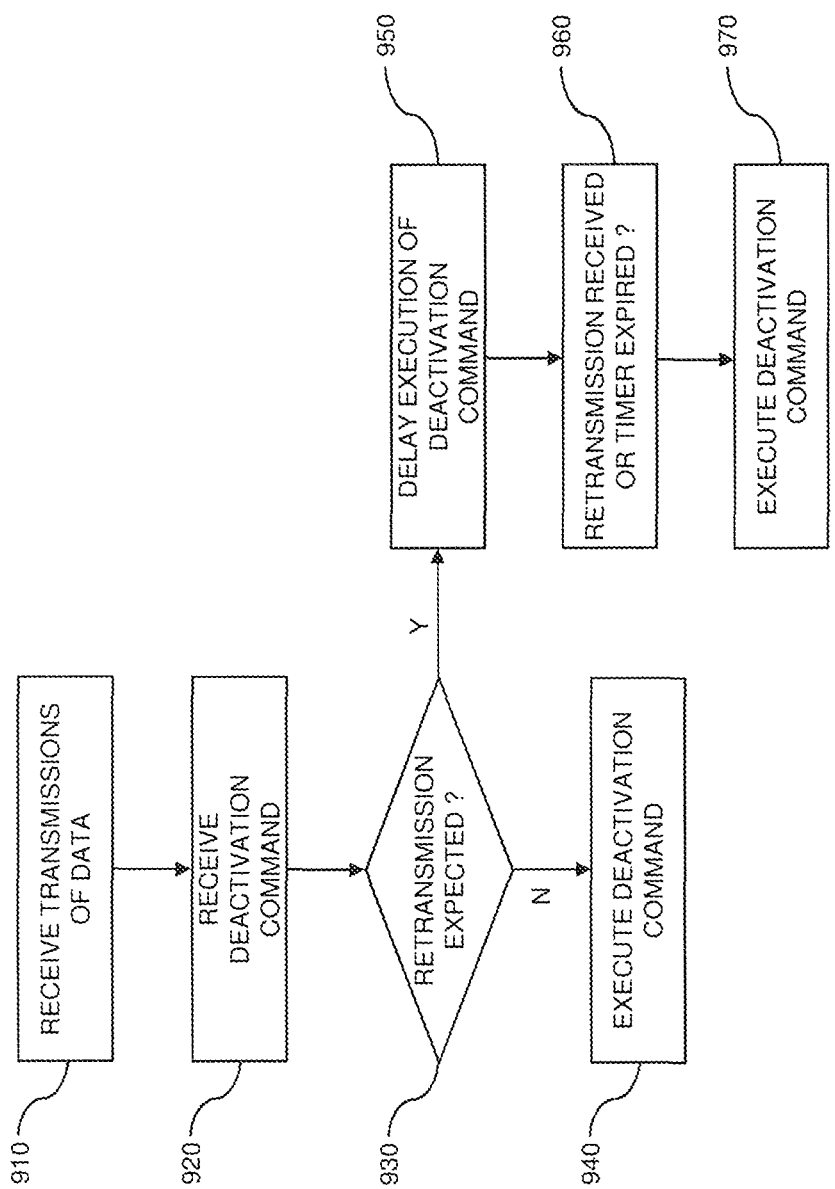
FIG. 9 shows a flowchart for illustrating a method according to an embodiment of the invention.

FIG. 9 shows a flowchart for schematically illustrating a method according to an embodiment of the invention. The method may be used for implementing the above-described processes of activity control in a transmitter, e.g., in the UE of FIGS. 1, 3 and 4.

As illustrated at step 910, the method may include receiving transmissions of data in the transmitter. The transmissions of data may be received on at least one transmission carrier, e.g., a DL SCC. For example, this may involve using a constellation of multiple CCs as described in connection with FIG. 2. The transmission of data may be performed using a corresponding interface of the communication device, e.g., the interface 130 as explained in connection with FIG. 10. In particular, the receiver unit 132 may be used for receiving the transmissions of data. Receiving the transmissions of data may also involve decoding the transmissions of data and performing a check whether a received transmission of data is defective. Decoding and performing the check whether a received transmission of data is defective may be accomplished by a processor, e.g., the processor 150 of FIG. 8. If a received transmission of data is determined to be defective, a repeat request may be sent by the transmitter to trigger a retransmission of this data, e.g., as explained in connection with FIG. 3. Further, if retransmissions are triggered, the method may also include receiving retransmissions, decoding the retransmissions, and performing a check whether a received retransmission is defective. If a received retransmission of data is determined to be defective, a repeat request may be sent by the transmitter to trigger a further retransmission, e.g., as explained in connection with FIG. 3.

At step 920, the transmitter receives a deactivation command, e.g., the deactivation command 401 of FIG. 4. The deactivation command may have the purpose of causing a deactivation of one or more transmission carriers, e.g., CCs as explained in connection with FIG. 2, in particular SCCs. These transmission carriers are used by the transmitter to receive the transmissions of data and possibly also the associated retransmissions. In some embodiments, the transmitter may receive the transmissions on a plurality of transmission carriers, and the deactivation command may have the purpose of deactivating all of these transmission carriers. Execution of the deactivation command may also cause deactivation of one or more transmission carrier, e.g., of one or more SCCs, while at least one further transmission carrier remains active, e.g., a PCC or one or more other SCCs. The deactivation command may be received from a base station, e.g., from an eNB. The deactivation command may be received in a MAC CE, e.g. in the form of one or more flags or bits, e.g., in the form of a bitmap. Execution of the deactivation command may deactivate a transmission carrier for receiving transmissions, e.g., a DL SCC, together with a corresponding transmission carrier for sending transmissions, e.g., an UL SCC corresponding to a DL SCC.

At step 930, the transmitter performs a check to determine if a retransmission, in particular a retransmission on the transmission carrier or transmission carriers to be deactivated, is expected. For this purpose, the transmitter may determine if a repeat request to trigger the retransmission was sent by the transmitter and the retransmission is not yet correctly received by the transmitter. The transmitter may also determine that a retransmission is expected if sending of a repeat request was triggered, which may be accomplished already before sending the repeat request. The transmitter may also determine that a retransmission is expected after detecting that a received transmission or retransmission is defective, which may be accomplished already before triggering sending of the repeat request. If this is the case, the transmitter may determine that a retransmission is expected. If the check of step 930 yields that no retransmission is expected, the method continues with step 940, as indicated by branch "N". If the check of step 930 yields that a retransmission is expected, the method continues with step 950, as indicated by branch "Y".

In step 940, the deactivation command is executed and the at least one transmission carrier is deactivated according to the deactivation command.

In step 950, execution of the deactivation command is delayed, e.g., as explained in connection with FIG. 4. If the deactivation command has the purpose of deactivating a plurality of transmission carriers, execution of the deactivation command may be delayed for all of these transmission carriers so that the transmission carriers may be deactivated simultaneously, e.g., as illustrated in FIG. 5. Alternatively, execution of the deactivation command may be delayed for only those of the transmission carriers on which a retransmission is expected, e.g., as illustrated in FIG. 6.

As indicated by step 960, execution of the deactivation command is delayed until the expected retransmission is received or a timer has expired, e.g., as explained in connection with FIG. 4. Expiry of the timer may indicate that the transmitter should stop waiting for a requested retransmission. The timer may be a retransmission timer of a HARQ protocol, e.g., a HARQ RTT Timer and/or a drx-RetransmissionTimer. Further, execution of the deactivation command may be delayed at least until the received transmissions of data and/or the received retransmissions have been decoded. Further, if the expected retransmission is received and it is determined that the received retransmission is defective, the transmitter may further delay the execution of the deactivation command, e.g., until at least one further retransmission is received or a timer has expired.

As indicated by step 970, after the delay, the transmitter may execute the deactivation command, i.e., deactivate the at least one transmission carrier according to the deactivation command.

Accordingly, in some embodiments the present invention relates to a method for controlling the activity of a transmitter, e.g., the UE 10, in a communication system with repeat requests. The transmitter is adapted to receive data on at least one transmission carrier, e.g., a CC as illustrated in FIG. 2, and to receive a command for deactivation, e.g., the deactivation command 401, of the at least one transmission carrier. In response to the command the transmitter performs a check if a retransmission is expected for data that was received on the transmission carrier. If this is not the case the carrier is deactivated according to the command. If this is the case, the execution of the command is delayed until the retransmission is received.

According to an embodiment, a retransmission may in particular be expected if a retransmission request was sent and the retransmission is not yet correctly received. In an embodiment, the execution of the command may, if the retransmission is defective, thus be further delayed until one or more further retransmissions are received.

A transmitter adapted to the proposed method may comprise a receiver unit, e.g., the receiver unit 132, for receiving data and deactivation commands. A transmitter unit, e.g., the transmitter unit 134, is adapted to send repeat requests. A processor in the transmitter, e.g., the processor 150, is adapted to check the correct data reception and to trigger the repeat requests. The processor is further adapted to control the deactivation of one or more carriers in the receiver unit in response to the deactivation commands. A control routine in the processor, e.g. as implemented by the delay control module 190, may determine if repeat requests are triggered and delay the deactivation until the triggered retransmission is received.

As mentioned above, the transmitter can be for example a user equipment, e.g. of an LTE system, and the receiver unit may be adapted to receive data on a plurality of carriers, e.g., a plurality of aggregated CCs as explained in connection with FIG. 2.

In the delayed deactivation behavior as described above, there is the possibility that the eNB does not know exactly when the UE deactivates one or more CCs. However, the eNB may deduce the deactivation from the feedback it receives from the UE. For example, if the eNB does not schedule any new data on any of the CCs for which it sent a deactivation command and receives a repeat request, e.g., a HARQ NACK, it may conclude that the UE kept the corresponding DL SCC active and is awaiting the retransmission.

While all descriptions in this text are made in terms of LTE communication systems it should be noted that the same concepts may also be used in other communication systems comprising the general features as mentioned above, e.g. in other communication systems using retransmission protocols with repeat requests.

It is to be understood that the examples and embodiments as explained above are merely illustrative and susceptible to various modifications. Further, it is to be understood that the above concepts may be implemented by using correspondingly designed software in existing UEs, or by using dedicated hardware in the UEs.

The invention claimed is:

1. A method of controlling activity of a user equipment in a communication system with repeat requests, the user equipment being adapted to receive data on a plurality of transmission carriers, the method comprising:
   receiving transmissions of data on a plurality of transmission carriers;
   receiving a deactivation command to deactivate the plurality of transmission carriers;
   determining that a retransmission of data is expected on at least one of the transmission carriers;
   receiving the retransmission of data on the at least one transmission carrier after receiving the deactivation command and prior to executing the deactivation command on the at least one transmission carrier; and
   after receiving the retransmission of data, deactivating the at least one transmission carrier either after a remainder of the plurality of transmission carriers have been deactivated or simultaneously with the remainder of the plurality of transmission carriers.

2. The method of claim 1, further comprising deactivating the remainder of the plurality transmission carriers after receiving the deactivation command and before deactivating the at least one transmission carrier.

3. The method of claim 1, further comprising delaying deactivating the remainder of the plurality of transmission carriers and simultaneously deactivating each of the plurality of transmission carriers after receiving the retransmission of data.

4. The method of claim 1, wherein receiving the transmissions of data on the plurality of transmission carriers comprises decoding the data and performing a check whether the data is defective.

5. The method of claim 4, further comprising determining that the data received at the at least one transmission carrier is defective and sending a repeat request to trigger the retransmission of the data.

6. The method of claim 1, wherein determining that the retransmission of data is expected on the at least one transmission carrier comprises determining that a repeat request to trigger the retransmission of data has been previously sent prior to receiving the deactivation command.

7. The method of claim 1, wherein determining that the retransmission of data is expected on the at least one transmission carrier comprises determining that the deactivation command has been received prior to sending a repeat request to trigger the retransmission.

8. The method of claim 1, further comprising delaying deactivating the at least one transmission carrier until the retransmission of data that is received has been decoded correctly.

9. The method of claim 1, wherein the transmission of data and the retransmission of data are transmissions and retransmissions of a Hybrid Automatic Repeat Request Protocol.

10. A method of controlling activity of a user equipment in a communication system with repeat requests, the user equipment being adapted to receive data on a plurality of transmission carriers, the method comprising:
    receiving transmissions of data on a plurality of transmission carriers;
    receiving a deactivation command to deactivate the plurality of transmission carriers;
    after receiving the deactivation command, determining that a retransmission of data is expected on at least one of the transmission carriers; and
    after receiving the retransmission of data, deactivating the at least one transmission carrier either after a remainder of the plurality of transmission carriers have been deactivated or simultaneously with the remainder of the plurality of transmission carriers.

11. A user equipment, comprising:
    a receiver configured to receive transmissions of data on a plurality of transmission carriers, to receive a deactivation command to cause a deactivation of the plurality of transmission carriers, and to receive a retransmission of data on at least one of the transmission carriers;
    a transmitter configured to send repeat requests; and
    a processor operatively connected to memory and configured to determine that the retransmission of data is expected on the at least one transmission carrier and, after receiving the retransmission of data, to deactivate the at least one transmission carrier either after a remainder of the plurality of transmission carriers are deactivated or to deactivate the at least one transmission carrier with the remainder of the plurality of transmission carriers.

12. The user equipment of claim 11, wherein the processor is configured to deactivate the remainder of the plurality transmission carriers after receiving the deactivation command and before deactivating the at least one transmission carrier.

13. The user equipment of claim 11, wherein the processor is configured to delay deactivating the remainder of the plurality of transmission carriers and simultaneously deactivate each of the plurality of transmission carriers after receiving the retransmission.

14. The user equipment of claim 11, wherein the processor is configured to determine that the retransmission of data is expected on the at least one transmission carrier by determining that a repeat request to trigger the retransmission has been previously sent.

15. The user equipment of claim 11, wherein the processor is configured to determine that the retransmission is expected on the at least one transmission carrier by determining that a repeat request to trigger the retransmission has not yet been sent to trigger the retransmission.

16. The user equipment of claim 11, wherein the processor is configured to delay deactivating the at least one transmission carrier until the received retransmission is decoded.

* * * * *